(12) United States Patent
Zhao et al.

(10) Patent No.: US 12,095,245 B2
(45) Date of Patent: Sep. 17, 2024

(54) WIRE HARNESS WALL-PASSING STRUCTURE AND INSTALLATION METHOD THEREOF

(71) Applicants: SHENYANG UNIVERSITY OF TECHNOLOGY, Liaoning (CN); LIAONING WUHUAN SPECIAL MATERIALS AND INTELLIGENT EQUIPMENT INDUSTRY TECHNOLOGY RESEARCH INSTITUTE, Liaoning (CN)

(72) Inventors: Jing Zhao, Liaoning (CN); Jianzheng Cui, Liaoning (CN); Shijie Wang, Liaoning (CN); Qingyu Zhang, Liaoning (CN); Junfei Zhang, Liaoning (CN); Xianwei Zhang, Liaoning (CN)

(73) Assignees: SHENYANG UNIVERSITY OF TECHNOLOGY (CN); LIAONING WUHUAN SPECIAL MATERIALS AND INTELLIGENT EQUIPMENT INDUSTRY TECHNOLOGY RESEARCH INSTITUTE CO., LTD (CN)

( * ) Notice: Subject to any disclaimer, the term of this patent is extended or adjusted under 35 U.S.C. 154(b) by 209 days.

(21) Appl. No.: 17/774,898

(22) PCT Filed: Oct. 18, 2021

(86) PCT No.: PCT/CN2021/124366
§ 371 (c)(1),
(2) Date: May 6, 2022

(87) PCT Pub. No.: WO2022/116715
PCT Pub. Date: Jun. 9, 2022

(65) Prior Publication Data
US 2023/0198240 A1 Jun. 22, 2023

(30) Foreign Application Priority Data
Dec. 1, 2020 (CN) .......................... 202011388262.1

(51) Int. Cl.
*H02G 15/013* (2006.01)
*F16L 5/02* (2006.01)
(Continued)

(52) U.S. Cl.
CPC .............. *H02G 15/013* (2013.01); *F16L 5/02* (2013.01); *H02G 3/22* (2013.01); *F16L 5/14* (2013.01)

(58) Field of Classification Search
CPC . H02G 15/013; H02G 3/22; F16L 5/02; F16L 5/14; F16L 5/04; F16L 5/08; F16L 5/06; F16L 5/10
See application file for complete search history.

(56) References Cited

U.S. PATENT DOCUMENTS 4,083,902 A * 4/1978 Clyde ................ H01R 13/5216
264/46.7
4,851,614 A * 7/1989 Duncan, Jr. .......... H05K 3/3468
29/854
(Continued)

FOREIGN PATENT DOCUMENTS

CN 109066532 A 12/2018
CN 208539503 U 2/2019
(Continued)

OTHER PUBLICATIONS

English Translation CN208539503, Special Vehicle Technology Center of Hubei Aerospace Technology Research Institute, Feb. 22, 2019 (Year: 2019).*
(Continued)

*Primary Examiner* — Steven T Sawyer
(74) *Attorney, Agent, or Firm* — John Maldjian, Esq.; Stevens & Lee PC

(57) ABSTRACT

A wire harness wall-passing structure and an installation method thereof. The wire harness wall-passing structure comprises: a sleeve pipe, a pouring sealant, and at least one sealing plug, wherein the sleeve pipe is alternately filled with the pouring sealant and the sealing plug along the axis direction of the sleeve pipe; and at least one first through hole formed in the sealing plug, and a wire harness which can penetrate through the pouring sealant and the first (Continued)

through hole in the sealing plug. According to the wire harness wall-passing structure, the sleeve pipe is filled with the pouring sealant and the sealing plug, so multi-stage sealing and multi-time sealing of the wire harness are achieved, the sealing performance of the wall-passing structure is greatly improved, and the wire harness wall-passing structure is more suitable for to-be-fixed devices such as a high pressure vessel.

6 Claims, 2 Drawing Sheets

(51) Int. Cl.
  *H02G 3/22* (2006.01)
  *F16L 5/14* (2006.01)

(56) References Cited

U.S. PATENT DOCUMENTS

| | | | | |
|---|---|---|---|---|
| 4,886,939 | A * | 12/1989 | Kinnan | H02G 15/013 174/99 R |
| 5,588,856 | A * | 12/1996 | Collins | H01R 13/5216 439/204 |
| 6,407,338 | B1 * | 6/2002 | Smith | H02G 15/113 174/92 |
| 10,033,133 | B2 | 7/2018 | Zorlu et al. | |
| 2005/0077722 | A1 * | 4/2005 | Kiely | H02G 3/0675 285/382.7 |
| 2011/0018206 | A1 * | 1/2011 | Beele | H02G 3/22 277/606 |
| 2013/0106060 | A1 * | 5/2013 | Beele | F16L 7/02 277/626 |
| 2017/0373428 | A1 * | 12/2017 | Zorlu | H01R 13/422 |
| 2020/0062197 | A1 * | 2/2020 | Nakaizumi | F16L 5/00 |
| 2021/0231236 | A1 * | 7/2021 | Priser | F16L 5/10 |

FOREIGN PATENT DOCUMENTS

| | | |
|---|---|---|
| CN | 211295538 U | 8/2020 |
| CN | 112490981 A | 3/2021 |
| CN | 214069463 U | 8/2021 |
| DE | 102016211372 A1 | 12/2017 |

OTHER PUBLICATIONS

International Search Report issued in connection with International Application No. PCT/CN2021/124366, mailed Jan. 11, 2022 (4 pages total).

\* cited by examiner

WIRE HARNESS WALL-PASSING STRUCTURE AND INSTALLATION METHOD THEREOF

CROSS REFERENCE TO RELATED APPLICATIONS

This application is a § 371 of International Application No. PCT/CN2021/124366, filed Oct. 18, 2021, entitled, "WIRE HARNESS WALL-PASSING STRUCTURE AND INSTALLATION METHOD THEREOF", which claims priority to Chinese Patent Application No. 202011388262.1, filed on Dec. 1, 2020, both of which are incorporated herein by reference in their entirety.

BACKGROUND

The present disclosure relates to the technical field of electrical devices, and in particular to a wire harness wall-passing structure and an installation method thereof.

Most of modern high pressure vessel systems are integrated with different electrical devices, the devices are connected through wire harnesses to transmit electric energy or electric signals, and wall-passing transmission of the wire harnesses between different high-pressure vessels is needed. High-pressure vessels often have certain requirements for air tightness and water tightness.

Generally, there are two types of current wire harness wall-passing structures: in the first type, wires or wire harnesses pass through walls individually and the wire harnesses pass through the wall plate of the vessel with a sleeve pipe; and in the second type, glue is injected into the sleeve pipe through which a wire harness penetrates, so a sealing effect is achieved, but the the sealing performance is insufficient and the sleeve pipe is not suitable for the high pressure vessel still exist.

SUMMARY

Embodiments in accordance with the present invention aim to provide a wire harness wall-passing structure and an installation method thereof, which are used for the wall-passing transmission of a power wire harness between different high-pressure vessels, so the sealing performance is better.

The Embodiments in accordance with the present invention provides a wire harness wall-passing structure, comprising a sleeve pipe, a pouring sealant and at least one sealing plug;

the sleeve pipe is alternately filled with the pouring sealant and the sealing plug along the axis direction of the sleeve pipe; and at least one first through hole is formed in the sealing plug, and a wire harness can penetrate through the pouring sealant and the first through hole in the sealing plug.

In one embodiment of the present invention the length direction of the first through hole is the axis direction of the sealing plug;

when the number of the first through holes is one, the first through hole penetrates through the middle part of the sealing plug; and when the number of the first through holes is multiple, the first through holes are formed in the sealing plug at intervals.

In another embodiment of the present invention the two ends of the sleeve pipe are filled with the pouring sealant, and the pouring sealant is insulating glue;

the sealing plug is made of rubber; and the section size of the sealing plug is not smaller than that of the inner cavity of the sleeve, and sealing convex plates protruding in the circumferential direction are formed at the two ends along the axis direction of the sealing plug.

In a further embodiment of the present invention the wire harness wall-passing structure further comprising a reamer, wherein the reamer comprises a tapered part and a reaming part which are detachably connected; and the small-size end of the tapered part is used for being inserted into the first through hole, the large-size end of the tapered part is connected with the reaming part, an accommodating hole is formed in the reaming part, and the wire harness can penetrate through the accommodating hole.

In another embodiment of the present invention at least one end of the sleeve pipe is provided with a sealing flange, a second through hole corresponding to the first through hole is formed in the sealing flange, and the wire harness can penetrate through the second through hole.

Further, the sealing flange comprises a main body part and an annular sleeving part; and the sleeving part is connected with one side of the main body part, and the sleeving part sleeves the exterior of the sleeve pipe.

The middle part of the sleeve pipe is sleeved with a fixed flange, and the fixed flange is used for being connected with a to-be-fixed device; and the sealing flange is connected with the fixed flange through connectors.

Further, the fixed flange is welded to the middle part of the sleeve pipe.

The wire harness wall-passing structure further comprises a sealing gasket positioned between the fixed flange and the to-be-fixed device, wherein a limiting convex plate is formed in the middle part of the side, facing the to-be-fixed device, of the fixed flange, and the sealing gasket is arranged in the circumferential direction of the limiting convex plate in a sleeving mode; and fixed holes are formed in the fixed flange and the sealing gasket correspondingly so that the fixed flange and the sealing gasket can be connected with the to-be-fixed device.

An embodiment of the present invention also provides an installation method of a wire harness wall-passing structure. The method comprises the following steps:

step one, connecting a sleeve pipe and a fixed flange, and installing the fixed flange on a to-be-fixed device;

step two, filling a pouring sealant and a sealing plug into the sleeve pipe alternately, enabling a wire harness to penetrate through the pouring sealant and the sealing plug, and enabling the wire harness to penetrate through a first through hole of the sealing plug through a reamer;

step three, repeating the second step until the sleeve pipe is completely filled; and step four, installing a sealing flange at at least one end of the sleeve pipe.

Compared with the prior art, embodiments of the present invention have the following beneficial effects:

According to the wire harness wall-passing structure provided by embodiments of the present invention, the sleeve pipe is filled with the pouring sealant and the sealing plug, so that multi-stage sealing and multi-time sealing of the wire harness are achieved, the sealing performance of the wall-passing structure is greatly improved, and the wire harness wall-passing structure is more suitable for to-be-fixed devices such as a high pressure vessel.

According to the installation method of a wire harness wall-passing structure provided by embodiments of the present invention, the sleeve pipe is filled with the pouring sealant and the sealing plug, so that multi-stage sealing and multi-time sealing of the wire harness are achieved, the sealing performance of the wall-passing structure is greatly improved, and the installation method is more suitable for to-be-fixed devices such as a high pressure vessel.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

DETAILED DESCRIPTION OF THE EMBODIMENTS

Figure 1:
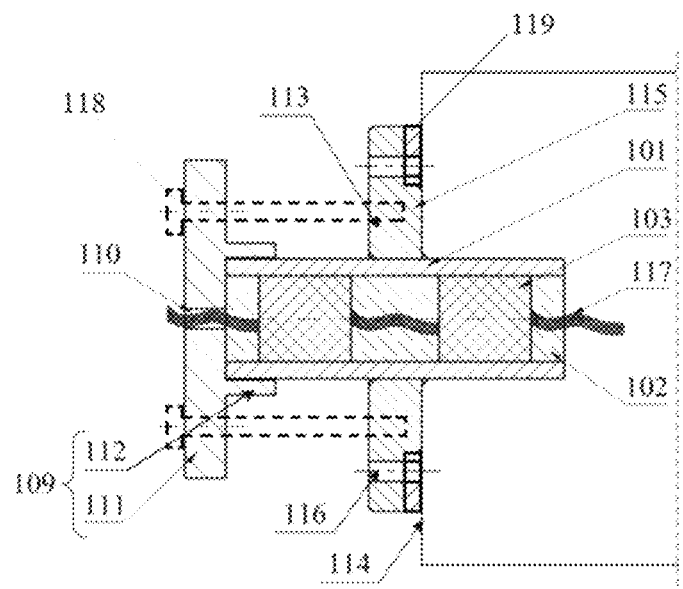
FIG. 1 is a structural schematic diagram of a wire harness wall-passing structure in accordance with an embodiment of the present invention.

The embodiments in the following description are merely a part rather than all of the embodiments of the present invention. All other embodiments obtained by a person of ordinary skill in the art based on the embodiments of this application without creative efforts shall fall within the protection scope of this invention.

In the description of embodiments of the present invention the indicative direction or position relations of the terms such as "center", "upper", "lower", "left", "right", "vertical", "horizontal", "inside" and "outside" are direction or position relations illustrated based on the attached figures, just for facilitating the description of embodiments of the present invention and simplifying the description, but not for indicating or hinting the indicated device or element must be in a specific direction and is constructed and operated in the specific direction, the terms cannot be understood as the restriction of embodiments of the present invention. Moreover, the terms such as "first", "second" and "third" are just used for distinguishing the description but cannot be understood to indicate or hint relative importance.

In the description of embodiments of the present invention, except as otherwise noted, the terms such as "install", "link" and "connect" should be generally understood, for example, the components can be fixedly connected, and also can be detachably connected or integrally connected; the components can be mechanically connected, and also can be electrically connected; the components can be directly connected and also can be indirectly connected through an intermediate, and two components can be communicated internally. For any person skilled in the art, the specific meanings of the terms in embodiments of the present invention can be understood according to specific conditions.

Referring to FIG. 1 to FIG. 4, in accordance with an embodiment of the present invention, a wire harness wall-passing structure is provided comprising a sleeve pipe 101, a pouring sealant 102 and at least one sealing plug 103, wherein the sleeve pipe 101 is alternately filled with the pouring sealant 102 and the sealing plug 103 along the axis direction of the sleeve pipe 101; and at least one first through hole 104 is formed in the sealing plug 103, and a wire harness 117 can penetrate through the pouring sealant 102 and the first through hole 104 in the sealing plug 103.

Specifically, the wire harness wall-passing structure comprises a sleeve pipe 101, a pouring sealant 102 and a sealing plug 103, wherein the sleeve pipe 101 can penetrate through the wall plate of the to-be-fixed device 1114 such as a high pressure vessel. The pouring sealant 102 and the sealing plug 103 are alternately arranged so as to seal and fill a routing cavity in the sleeve pipe 101.

In the specific operation, firstly, a plurality of wire harnesses 117 penetrate through first through hole 104 formed in the sealing plug 103 in a one-to-one correspondence mode, and primary wall-passing structure sealing of first-stage sealing is achieved; the pouring sealant 102 such as polyurethane is filled at the joint of the wire harnesses 117 and the sealing plug 103, so that secondary wall-passing structure sealing of first-stage sealing is realized; and then the operations of filling the sealing plug 103 and filling the polyurethane pouring sealant 102 are repeated, so that the two-stage sealing of the wall-passing structure is realized, and then the multi-stage sealing of the wall-passing structure can be realized.

According to the wire harness wall-passing structure provided by the present disclosure, the sleeve pipe 101 is filled with the pouring sealant 102 and the sealing plug 103, so that multi-stage sealing and multi-time sealing of the wire harness 117 are achieved, the sealing performance of the wall-passing structure is greatly improved, and the wire harness wall-passing structure is more suitable for to-be-fixed devices such as a high pressure vessel.

In an embodiment of the present invention, the length direction of the first through hole 104 is the axis direction of the sealing plug 103; when the number of the first through holes 104 is one, the first through hole 104 penetrates through the middle part of the sealing plug 103; and when the number of the first through holes 104 is multiple, the first through holes 104 are formed in the sealing plug 103 at intervals.

Figure 2:
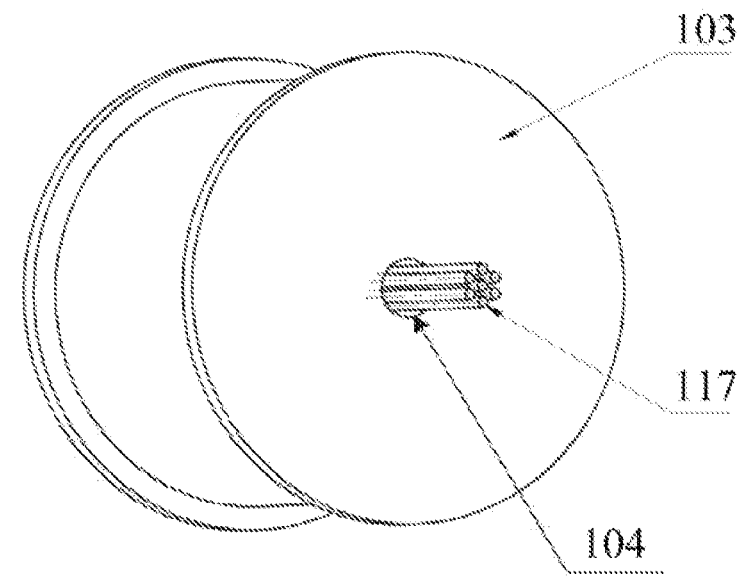
FIG. 2 is a first structural schematic diagram of a sealing plug in accordance with an embodiment of the present invention.
Figure 3:
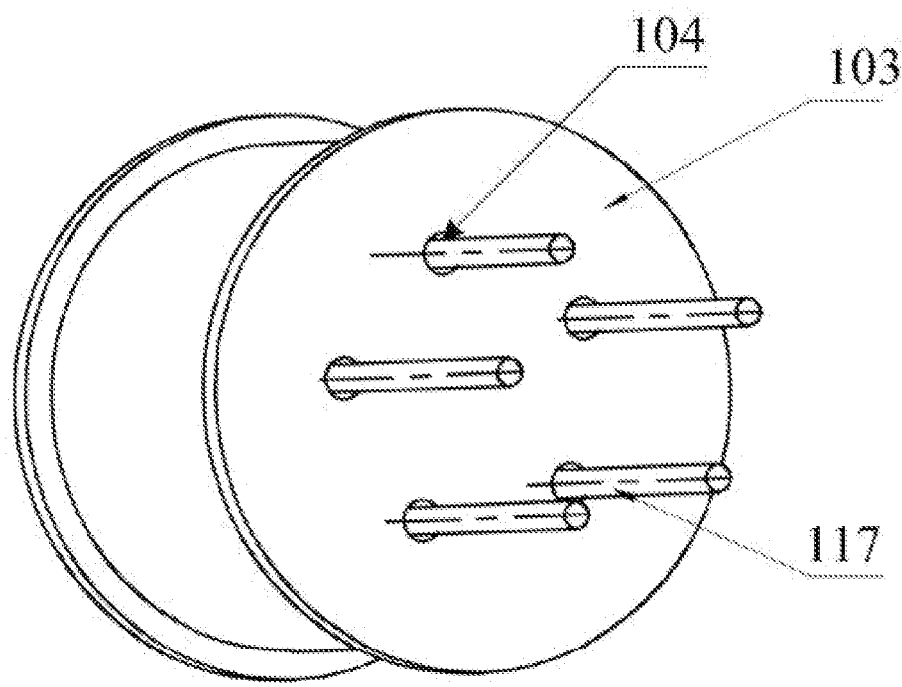
FIG. 3 is a second structural schematic diagram of a sealing plug in accordance with an embodiment of the present invention.
Figure 4:
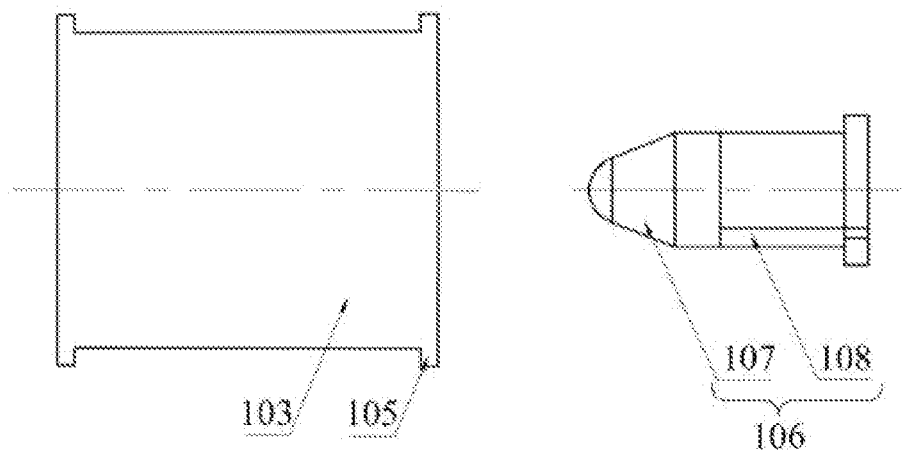
FIG. 4 is a using schematic diagram of a sealing plug and a reamer in accordance with an embodiment of the present invention.

Referring to FIG. 2 and FIG. 3, generally, when the total cross sectional area of a cable is smaller than 0.3 mm$^2$, a plurality of cables can be integrated into a wire harness 117, a first through hole 104 is formed in the sealing plug 103, the first through hole 104 is formed in the middle part of the sealing plug 103, namely, the wire harness 117 is also located at the central position of the sealing plug 103, and the sealing plug 103 seals the periphery of the wire harness 117 more uniformly.

When the total cross-sectional area of the cable is larger than 0.3 mm$^2$, the cable is divided into a plurality of wire harnesses 117, and a plurality of first through holes 104 arranged at intervals are formed in the sealing plug 103, so the wire harnesses 117 can respectively pass through the first through holes 104. Preferably, the first through holes 104 in the outer layer are equally spaced from the side wall of the sealing plug 103, and the sealing plug 103 seals the wire harness 117 in the first through holes 104 in the outer layer more uniformly.

In another embodiment of the present invention, the two ends of the sleeve pipe 101 are filled with the pouring sealant 102, the pouring sealant 102 has certain viscosity so that the sealing effect is achieved, and meanwhile, the sealing plug 103 can be adhered and fixed; and the pouring sealant 102 is insulating glue, except the polyurethane pouring sealant, optionally, the pouring sealant 102 can be electronic insulating sealants such as an epoxy resin pouring sealant, an LED pouring sealant and the like.

The sealing plug 103 is made of rubber, and specifically, the sealing plug 103 can be made of natural rubber or synthetic rubber. The rubber has high elasticity, can achieve a sealing effect, has an insulating effect, can ensure the insulativity of the wall-passing structure, and can be suitable for electrical devices such as a high-pressure vessels filled with non-insulating liquid.

The section size of the sealing plug 103 is not smaller than that of the inner cavity of the sleeve pipe 101, and the sealing plug 103 can be extruded to completely fill the inner cavity of the sleeve pipe 101; and further, the sealing convex plates 105 protruding in the circumferential direction are formed at the two ends along the axis direction of the sealing plug 103, so that liquid can be prevented from entering from one end of the sleeve pipe 101 and leaking to the other end of the sleeve pipe 101 through the sealing plug 103.

Of course, various kinds and forms of rubber sealing plugs 103, such as cylindrical rubber sealing rings or conical rubber sealing rings, can be used in the device.

The wire harness wall-passing structure further comprises a reamer 106, wherein the reamer 106 comprises a tapered part 107 and a reaming part 108 which are detachably connected; and the small-size end of the tapered part 107 is used for being inserted into the first through hole 104, the large-size end of the tapered part 107 is connected with the reaming part 108, an accommodating hole is formed in the reaming part 108, and the wire harness 117 can penetrate through the accommodating hole.

Accordingly, when the section size of the first through hole 104 in the sealing plug 103 is smaller than that of the wire harness 117, the first through hole 104 can be reamed by the reamer 106 to facilitate the wire harness 117 to pass through the first through hole 104.

Specifically, through the arrangement of the tapered part 107, the operation that the reamer 106 is inserted into the first through hole 104 is more easily, the insertion operation continues until the reaming part 108 is inserted into the first through hole 104, then the tapered part 107 at the front end is removed, the accommodating hole in the reaming part 108 forms a through hole structure to allow the wire harness 117 to pass through, and after the wire harness 117 completely passes through the first through hole 104, the reamer 108 can be removed, so that the wire harness 117 is left in the first through hole 104.

Preferably, the length of the reaming part 108 is not smaller than that of the first through hole 104, so that the tapered part 107 can be conveniently detached and the first through hole 104 can be completely reamed.

The wire harness wall-passing structure in another embodiment is improved based on the above embodiment, the technical content disclosed in the above embodiment is not repeatedly described, and the content disclosed in the above embodiment also belongs to the content disclosed in the second embodiment.

In further embodiment, at least one end of the sleeve pipe 101 is provided with a sealing flange 109, a second through hole 110 corresponding to the first through hole 104 is formed in the sealing flange 109, and the wire harness 117 can penetrate through the second through hole 110.

As shown in FIG. 1, optionally, the sealing flange 109 is only installed at the end, located on the outer side of a high-pressure vessel, of the sleeve pipe 101, external water vapor is prevented from entering the high-pressure vessel, and the cost is relatively saved. Corresponding to the sealing plug 103, the sealing flange 109 also comprises a second through hole 110 or a plurality of second through holes 110, and the principle of the sealing flange 109 is consistent with that of the sealing plug 103 and is not repeated here.

In an optional scheme of the embodiment, the sealing flange 109 comprises a main body part 111 and an annular sleeving part 112; and the sleeving part 112 is connected with one side of the main body part 111, and the sleeving part 112 sleeves the exterior of the sleeve pipe 101.

The annular sleeving part 112 wraps the end part of the sleeve pipe 101, and the sleeve pipe 101 is further isolated from the outside, so that a better sealing effect is realized. Preferably, the main body part 111 and the sleeving part 112 are integrally formed, so that the strength and the sealing performance are better.

The middle part of the sleeve pipe 101 is sleeved with a fixed flange 113, and the fixed flange 113 is used for being connected with a to-be-fixed device 114; and the sealing flange 109 is connected with the fixed flange 113 through connectors 118.

As shown in FIG. 1, the end, away from the sealing flange 109, of the sleeve pipe 101 extends into the high-pressure vessel, the fixed flange 113 is arranged in the middle of the sleeve pipe 101 in a sleeving mode to be connected with the outer wall of the high-pressure vessel, and therefore the wire harness wall-passing structure is fixed. Specifically, the fixed flange 113 can be installed on the two sides or the top of the high pressure vessel and is quite convenient to use.

Further, the sealing flange 109 and the fixed flange can be connected through connectors such as bolts, so that the sealing flange 109 is fixed to the end part of the sleeve pipe 101.

The fixed flange 113 is welded to the middle part of the sleeve pipe 101, so that reliable connection of the fixed flange 113 and the sleeve pipe 101 is realized.

The wire harness wall-passing structure further comprises a sealing gasket 119 positioned between the fixed flange 113 and the to-be-fixed device 114, wherein a limiting convex plate 115 is formed in the middle part of the side, facing the to-be-fixed device 114, of the fixed flange 113, and the sealing gasket 119 is arranged in the circumferential direction of the limiting convex plate in a sleeving mode; and fixed holes 116 are formed in the fixed flange 113 and the sealing gasket 119 correspondingly so that the fixed flange 113 and the sealing gasket 119 can be connected with the to-be-fixed device 114.

In an embodiment of the present invention, the sleeve pipe 101 extends into the high pressure vessel at the opening of the high pressure vessel, and the sealing gasket is arranged between the fixed flange 113 and the high pressure vessel in order to ensure reliable sealing at the opening. On one hand, the limiting convex plate 115 is used for fixing the sealing gasket, and on the other hand, the side wall of the limiting convex plate 115 can play a role in blocking, so that the sealing effect is improved.

Further, fixed holes 116 are formed in the fixed flange 113 and the sealing gasket correspondingly, and the connectors such as bolts can pass through the fixed holes 116 so that the fixed flange 113 and the sealing gasket are fixed to the high-pressure vessel.

Optionally, connecting holes corresponding to the fixed holes can be formed in the sealing flange 109, and the connectors such as bolts can penetrate through the connecting holes of the sealing flange 109, the fixed flange 113 and the fixed holes 116 of the sealing gasket to fix the sealing flange 109; or holes are formed in the fixed flange 113 additionally at other positions so as to correspond to the connecting holes of the sealing flange 109, so that the sealing flange 109 can be fixed.

In another embodiment of the present invention an electrical device comprising the wire harness wall-passing structure of any one of the above embodiments. Therefore, all the beneficial technical effects of the wire harness wall-passing structure of any one of the above embodiments are achieved, and are not repeated here.

In an additional embodiment of the present invention an installation method of a wire harness wall-passing structure, comprising the following steps:

step one, connecting a sleeve pipe and a fixed flange, and installing the fixed flange on a to-be-fixed device;

step two, filling a pouring sealant and a sealing plug into the sleeve pipe alternately, enabling a wire harness to penetrate through the pouring sealant and the sealing plug, and enabling the wire harness to penetrate through a first through hole of the sealing plug through a reamer;

step three, repeating the second step until the sleeve pipe is completely filled; and step four, installing a sealing flange at at least one end of the sleeve pipe.

Further, the sleeve pipe is filled with the pouring sealant and the sealing plug, so that multi-stage sealing and multi-time sealing of the wire harness are achieved, the sealing performance of the wall-passing structure is greatly improved, and the installation method is more suitable for to-be-fixed devices such as a high-pressure vessel.

Finally, it should be noted that the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present disclosure. Furthermore, those skilled in the art will appreciate that, although some embodiments herein include certain but not other features included in other embodiments, combinations of features of different embodiments are meant to be within the scope of the present disclosure and form different embodiments.

What is claimed is:

1. A wire harness wall-passing structure, comprising connectors, a sleeve pipe, a pouring sealant and at least one sealing plug, wherein the sleeve pipe is alternately filled with the pouring sealant and the sealing plug along the axis direction of the sleeve pipe; and at least one first through hole is formed in the sealing plug, and a wire harness can penetrate through the pouring sealant and the first through hole in the sealing plug;

wherein at least one end of the sleeve pipe is provided with a sealing flange, a second through hole corresponding to the first through hole is formed in the sealing flange, and the wire harness can penetrate through the second through hole;

wherein the middle part of the sleeve pipe is sleeved with a fixed flange, and the fixed flange is used for being connected with a to-be-fixed device; and the sealing flange is connected with the fixed flange through the connectors;

the wire harness wall-passing structure further comprising:

a sealing gasket positioned between the fixed flange and the to-be-fixed device, wherein a limiting convex plate is formed in the middle part of the side, facing the to-be-fixed device, of the fixed flange, and the sealing gasket is arranged in the circumferential direction of the limiting convex plate in a sleeving mode; and fixed holes are formed in the fixed flange and the sealing gasket correspondingly so that the fixed flange and the sealing gasket can be connected with the to-be-fixed device.

2. The wire harness wall-passing structure according to claim 1, wherein the length direction of the first through hole is the axis direction of the sealing plug;

when the number of the first through holes is one, the first through hole penetrates through the middle part of the sealing plug; or when the number of the first through holes is multiple, the first through holes are formed in the sealing plug at intervals.

3. The wire harness wall-passing structure according to claim 1, wherein the two ends of the sleeve pipe are filled with the pouring sealant, and the pouring sealant is insulating glue;

the sealing plug is made of rubber; and the section size of the sealing plug is not smaller than that of the inner cavity of the sleeve pipe, and sealing convex plates protruding in the circumferential direction are formed at the two ends along the axis direction of the sealing plug.

4. The wire harness wall-passing structure according to claim 3, further comprising a reamer, wherein the reamer comprises a tapered part and a reaming part which are detachably connected; and the small-size end of the tapered part is used for being inserted into the first through hole, the large-size end of the tapered part is connected with the reaming part, an accommodating hole is formed in the reaming part, and the wire harness can penetrate through the accommodating hole.

5. The wire harness wall-passing structure according to claim 1, wherein the sealing flange comprises a main body part and an annular sleeving part; and the sleeving part is connected with one side of the main body part, and the sleeving part sleeves the exterior of the sleeve pipe.

6. The wire harness wall-passing structure according to claim 1, wherein the fixed flange is welded to the middle part of the sleeve pipe.

* * * * *